United States Patent
Vellante et al.

(10) Patent No.: US 7,313,580 B2
(45) Date of Patent: Dec. 25, 2007

(54) SYSTEMS AND METHODS FOR SHARING INFORMATION BETWEEN A USER GROUP AND ASSOCIATED DOCUMENT

(76) Inventors: Domenico Vellante, Via S. Apollonia 20, 56127 Pisa (IT); Vittorio Luigi Brioschi, Via Augusta 48/54 7-4, 08006 Barcelona (ES)

( * ) Notice: Subject to any disclaimer, the term of this patent is extended or adjusted under 35 U.S.C. 154(b) by 411 days.

(21) Appl. No.: 11/052,198

(22) Filed: Feb. 8, 2005

(65) Prior Publication Data

US 2005/0198132 A1    Sep. 8, 2005

(51) Int. Cl.
   *G06F 17/00*    (2006.01)
(52) U.S. Cl. .................. 707/204; 707/203; 707/101
(58) Field of Classification Search .................. None
   See application file for complete search history.

(56) References Cited

U.S. PATENT DOCUMENTS

| 7,236,976 | B2 * | 6/2007 | Breitenbach et al. ....... 707/100 |
| 2003/0135565 | A1 | 7/2003 | Estrada |
| 2003/0177025 | A1 * | 9/2003 | Curkendall et al. ............ 705/1 |
| 2003/0182435 | A1 * | 9/2003 | Redlich et al. ............. 709/229 |
| 2004/0122898 | A1 | 6/2004 | Srinivasa |
| 2005/0138110 | A1 * | 6/2005 | Redlich et al. ............. 709/201 |
| 2006/0101071 | A1 * | 5/2006 | Henderson ............... 707/104.1 |

FOREIGN PATENT DOCUMENTS

WO    WO 01/52081 A1    7/2001

* cited by examiner

*Primary Examiner*—Sana Al-Hashemi
(74) *Attorney, Agent, or Firm*—Birch, Stewart, Kolasch & Birch, LLP

(57) ABSTRACT

Systems and methods of the present invention connect a group of users who are involved in a common project. The information on this project will be stored in an electronic document. Each member of the group has an exact copy of the document and the method of this invention is what ensures that such copies are exact. Each user may incorporate modifications into their copy, which will later be shared by the rest after a synchronization stage. Systems and methods further allow the information to be shared between the various members of the group and which include a series of stages during which it is mainly a question of transferring the modifications from a specific user to the rest of the group, thus avoiding the use of a dedicated client-server structure.

20 Claims, 3 Drawing Sheets

SYSTEMS AND METHODS FOR SHARING INFORMATION BETWEEN A USER GROUP AND ASSOCIATED DOCUMENT

BACKGROUND TO THE INVENTION

1. Field of the Invention

Systems and methods consistent with principles of some embodiments of the present invention provide for sharing information between a user group and an associated document and, more particularly, provide for making use of a distributed information framework without the need for a project management server, offering a common document to all participants in the project with very low requirements in terms of computer resources 2. Related Art One of the greatest advances from the use of computers has been the efficient handling of information, thus reducing processing time. Management tool developers tend to look for bottlenecks in procedures for collaboration on projects in which a certain number of participants are involved. These bottlenecks can be eliminated by improving interaction between the participants in the project.

One of the frameworks for implementation of a computer solution most often used to provide a certain service is the client-server one. This framework has some advantages in terms of centralized processing of information and administration of resources; however, the minimum requirements in physical and computational resources are high. It is essential to have available high-performance and high-availability computers, qualified personnel to work with such computers and the software required for managing the information.

When a group project is to be carried out, the execution time may be significantly reduced if the contributions from each of the members collaborating on the project are easily available for the rest of the group. As electronic mail has provided a major advance in communication between users, this tool has been developed with several solutions, which facilitate group work.

Publication number U.S. 2003135565 describes an electronic mail application, which allows participants to view a centralized project. This centralized project makes use of a server on which the project is centralized so that users may view the document in their electronic mail application. This application brings together both of the aspects mentioned, a client-server framework and centralized distribution of the project.

Publication number WO2001052081 describes an invention consisting of a method of collaboration between a user group where electronic mails are stored in a database in the form of a web page, with other users being informed when the page has been updated by one of the users.

Finally, publication number U.S. 2004122898, describes a method for revising a digital document on a network, which involves recording of notes made separately by users. These notes are saved separately from the document and logical links are made to the document. This operation of establishing a relationship between the notes and the document is separate from the program for viewing the document. In this framework, each participant still acts in a centralized manner with a collaboration service treated as a separate unit.

However, there is a need for a system that does not operating in the conventional client-server environment as demonstrated in the cited art. Systems and methods, consistent with some embodiments of the present invention make use of a distributed information framework without the need for a project management server, offering a common document to all participants in the project with very low requirements in terms of computer resources.

SUMMARY OF THE INVENTION

Systems and methods, consistent with some embodiments of the present invention, provide for sharing information between a user group, as well as the document used for carrying out this method.

The method relates a group of users who are involved in a common project. The information from this project will be collected in an electronic document.

Each of the members of the group has an exact copy of the document and it is the method of this invention which ensures that such copies are exact.

The document allows heterogeneous data to be grouped together, such as images, text, links or sounds, which are organized according to the wishes of the group members.

Each user may incorporate modifications into his copy which will then be shared with the rest after a synchronization stage.

A feature consistent with some embodiments of the present invention allows for sharing of information between the various members of the group and which consists of a series of stages in which it is mainly a case of the modifications made by a specific user being transferred to the rest of the group.

These modifications are transmitted by a transport protocol, for example, electronic mail, thus avoiding the use of a specific client-server structure.

Receipt of the modifications by the rest of the users involves an update process which allows the rest of the copies of the electronic document in the possession of the remaining users to be updated.

BRIEF DESCRIPTION OF THE DRAWINGS

The accompanying drawings, which are incorporated herein and constitute a part of this specification, illustrate embodiments of the invention and, together with the description, explain the principles of the invention. In the drawings.

DETAILED DESCRIPTION

Reference will now be made in detail to the features of the principles consistent with some embodiments of the present invention, example of which are illustrated in the accompanying drawings. Wherever possible, the same reference numbers will be used throughout the drawings to refer to the same or like parts.

Systems and methods consistent with some embodiments of the present invention provide for sharing information within a user group. These systems and methods for sharing information make use of a group of computers connected via a network and operated by users who are collaborating on a common project.

System Architecture

Figure 1:
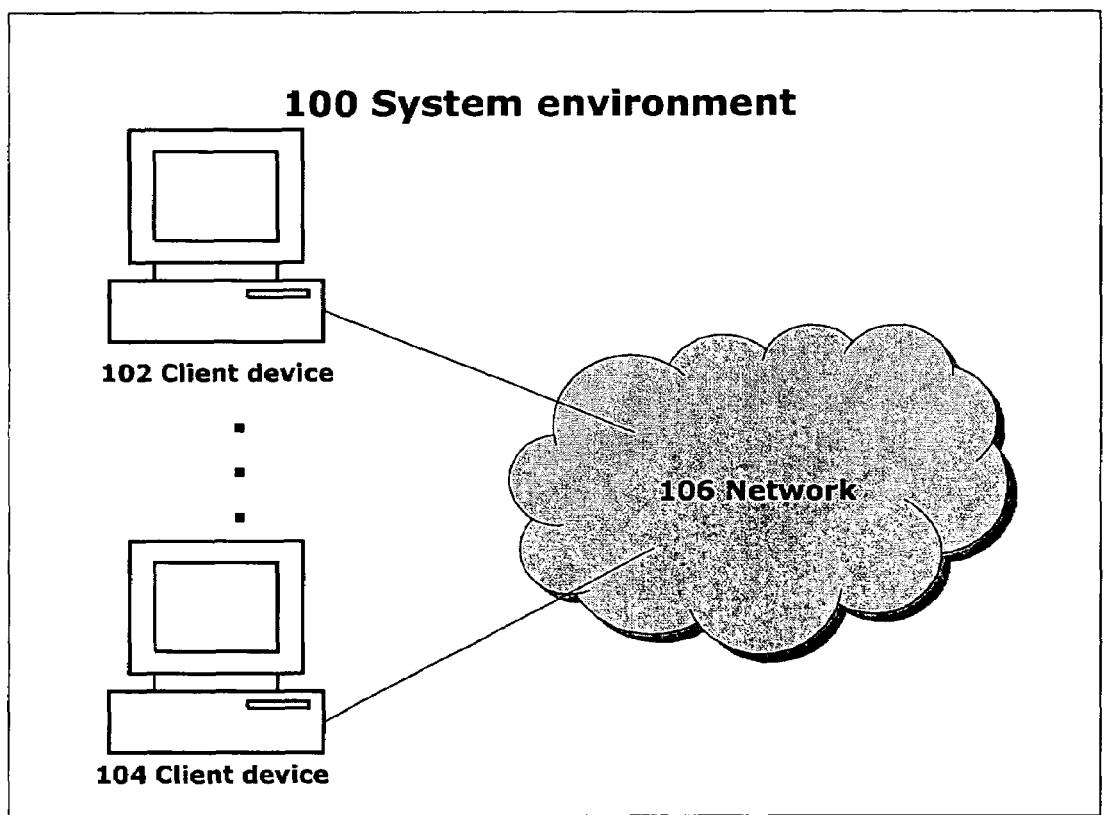
FIG. 1 depicts an exemplary system environment for implementing features consistent with principles of the present invention.

FIG. 1 is an exemplary diagram of a system environment 100 for implementing the principles consistent with some embodiments of the present invention. The components of system 100 may be implemented through any suitable combinations of hardware, software and/or firmware. As shown in FIG. 1, system 100 includes a plurality of client devices 102, 104 and network 106. Additional devices may reside on network 106. While network 106 may be implemented as the Internet, network 106 may be any local or wide area network, either public or private. Client devices 102, 104 may access each other and other devices through network 106

Figure 2:
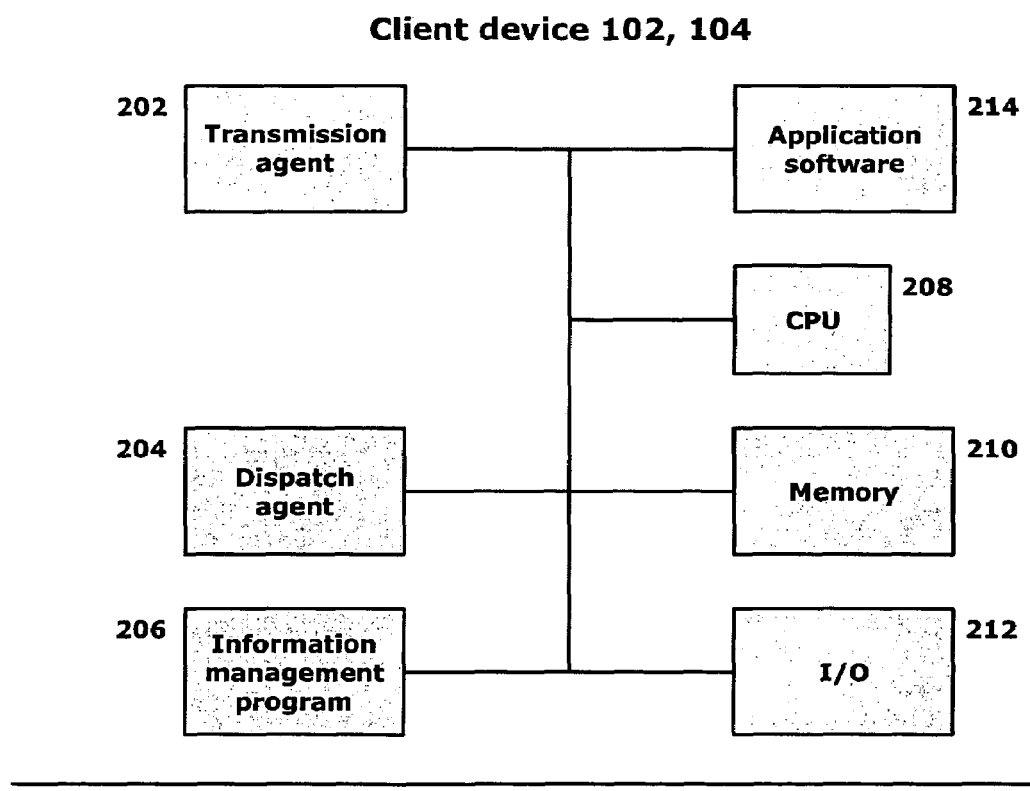
FIG. 2 depicts an exemplary diagram of the components of a client computer, consistent with some embodiments of the present invention.

FIG. 2 depicts an exemplary block diagram of components included in client devices 102, 104. Client devices 102, 104 may be any type of computing device, such as a personal computer, workstation, personal digital assistant, cellular telephone, etc., that is capable of communicating, either directly or indirectly, on network 106. Client devices 102, 104 may include, for example, transmission agent 202, dispatch agent 204, main information management program 206, central processing unit 208, memory 210, input/output devices 212, and application software 214.

Transmission agent 202 may be utilized to read dispatch agent distributed data in output and to insert data in packets ready to be sent to workgroup participants. A packet characteristic may be its sequence number as the sequence number may be useful when received packets are out of the established sequence. In addition to electronic mail, transmission procedures may include, for example, P2P (peer-to-peer) transmission that may speed up delivery time when participants are on-line. Transmission agent may be a program external to the one that manages the shared document as, for example, an electronic mail client or an electronic mail program add-in or file sharing P2P program.

Dispatch agent 204 may be utilized to encode/decode data to be shown to the user. When a user interacts with the shared document, the main program delivers information to dispatch agent which distributes them to all participants. In the same way, when data are received from other participants, dispatch agent decodes and notifies them to the main program which manages the shared document. Dispatch agent may be implemented as a proprietary program or internal module which manages the shared document and depicts the interface between the document and the external transmission agent.

Main information management program 206 may be utilized to manage the shared document by interacting with both the user interface module and the dispatch agent. Information management program manages the relationships between objects available on the shared document(s) and their storage.

Application software 214 may be the program which acts as the user interface to add and visualize shared documents and to manage the shared documents collection by interacting with the information management program 206. Application software 214 may be implemented in a stand-alone mode or as a plug-in for any other application such as an electronic mail client, a browser, an operating system shell, etc.

Definition of the Workgroup

This common project comprises a group of users who may have various privileges regarding the information to be handled.

The user who is leading the project is the one who may define both the group, inviting users to participate, and the attributes each of the members will have. This user will be called the administrator.

The first phase of the method may be defining the group. The group and each user are defined with a unique identifier and, although not only, as will be seen in the examples herein, the electronic mail address may be the identifier for each user.

Every time a new user is invited to join, he may have the same management resources as the user who is the project administrator as well as the attributes granted to him by the administrator regarding access to the electronic document, which they share. The management resources are the group of applications, which allow the exchange of information as well as the tools for viewing and editing.

In a large user group, it is possible to define several groups each with their own administrator without the need for there to be the same number or the same individuals making up each group. Each of these groups may be involved in a different project or electronic document. Also, each of the groups will have an administrator who will be the one who has invited each of the members of the group to participate in the document.

One of the plurality of devices on the network may be designated as the back up device, wherein a user at the back up device manages a copy of any document sent by any of the users in the network and controls mechanisms to restore information that may be eventually lost by the users.

This shared electronic document may not be unique, nor does it reside on a server but each member of the group has an identical copy. There may be as many copies as there are members of the group.

Each group member has attributes which allow them to carry out a series of actions, i.e., insertion of text, images, sound, modifications to documents with respect to contents or visual representation mode, inclusion of notes on an object contained in the document, inclusion of a link between two items, etc.

As an example, the lack of an attribute, such as that of writing, may not allow this user to modify the contents but he may be able to read it. The attributes policy sets out the actions, which may and may not be carried out by group members.

Once the framework or environment for working has been established, each member of the group may act on their copy according to the attributes they have available. Each of the changes carried out are only made on their copy, making it necessary to establish a synchronization method, which allows these contributions or modifications to be shared with the rest of the group. After the synchronization stage, the rest of the copies will incorporate these modifications so that if all users synchronize their documents, all the copies will be identical.

The Electronic Document

The electronic document is a document provided with homogenous objects which allow storage of heterogeneous contents since it admits elements of different types, such as text, images, sounds, links, notes, etc., and is thus able to handle them all in one way.

The electronic document includes diverse information and details are given below of what is considered essential or indispensable:

Identification of Group. This identification allows a user to participate in more than one project while keeping projects or electronic documents separate. When a new document is created relating to a project, a new identifier is generated for the document. This identifier can be called GUID (group user identification). Characterization by GUID, both of users as well as objects and documents, allows them to be identified as homogeneous elements between which correlations can be generated.

Correlation is understood as the capacity to generate logic-time relations between the homogeneous elements mentioned. For example, it is possible to establish a link between an image and a note on the image, both from the person who inserts this image and another user. The second user will maintain time dependence with respect to the comment from the first one to be included in the document. Comments are clear examples of information, which should be maintained in chronological order.

List of Users. This list defines the users who make up the group and the attributes each of them has available. The attributes of each of the users establish the document resources which are accessible or modifiable by each user. However, there is the possibility of making use of a list of contacts which can process possible new users who may be invited to join later. This address book should not be confused with the list of users which corresponds to those who can actually share the electronic document.

Viewing Structure. Viewing structure refers to the data structure which incorporates the information on the visual and representational aspects which allow the document to be reproduced on any computer by a user so that it is sure to appear in the same way for all of the users. Examples of data stored which affects the visual aspects of an item are the color, position, shape or inclusion of shading.

Objects. Objects are the entities which the user handles directly by inserting, deleting or modifying. Among these objects are images, text portions, notes specifically linked to other objects, for example, as a comment to an image, videos, sound recordings, etc. Objects are of different types and constitute the main content of the information stored which is directly related to the project. Objects have information on the user who created or modified them, as well as the time when the object was modified. The information management program is capable of displaying all changes and the authors of these changes.

Objects may be classified into three categories which are not necessarily mutually exclusive:

Container Objects. Container objects are those which act as containers for others. For example: a box containing various images with comments on them. A specific case are containers which allow the inclusion of several types of pages.

Non-container Objects. These are objects which cannot act as containers for other objects. An example is geometric objects such as a rectangle in which it is possible to include text although it does not have text editor facilities.

Parent Objects and Child Objects. Objects have a parent-child relationship, in other words, there is a parent object and other child objects may depend on it. In turn, the child objects may be parent objects of others which depend on them. An example of a child object is a comment on an image. The parent object is the image and the child object is the comment.

Storage Space. Each of the electronic documents has a temporary place for storage. This place for storage may be a folder or directory where in turn there are one or more files which include information relating to the document. For example, if the information is stored in XMLm format, there will be several files used: style file, images, main document with mark-ups, etc.

This latter aspect has been left until the end of the list of document components to allow a description of the method of the invention, which consists of ensuring that each user's copy is identical. This characteristic allows the invention not to depend on a specific server.

When a user saves the changes made to his copy of the document from the temporary storage space to the hardware, not only is this storage updated but the elements updated are packaged and saved in a spooler or temporary waiting area for data to be sent. This same user may carry out more than one save operation which is why at least as many packets as orders issued will be stored in the spooler. To avoid sending large packets, it is possible that given a single order to save more than one small packet is created.

The list of updates, which makes up the group of packets, defines a list which may be called the "journal" leading to update of a document from the packets generated. From this list, it is possible to determine the time of incorporation of each modification to the document.

When the user decides to share information or modifications incorporated into his copy of the document with the rest of the group, he issues the synchronization order. The sharing process provides the use of a transmission agent, which is responsible for sending and receiving the information. When the user shares his modifications with the rest of the members of the group, the transmission agent accesses the output spooler, reads it, encodes the data, compresses it and sends it to the dispatch agent. If, for example, and without excluding other possibilities, the dispatch agent is the electronic mail, the information is sent by making use of an electronic mail document. Successive shared dispatches may only send the journal with the information packets, which merely contain the variations, which the electronic document has undergone. The rest of the users in the group receive the information sent and decode it according to the specific format of the electronic document belonging to this invention.

Incorporation of the decoded information generates the appropriate resources in the copies of the electronic document which users receive and allows the copies to be updated to make them the same as the original.

The processes of encoding, compression and/or encryption may not be taken on by the main information management program but by the transmission agent.

When all the users belonging to the group issue the synchronization order and it is executed, all the copies of the electronic document become identical.

Some alternatives are provided to demonstrate how to operate the invention, establishing at each stage the resources, which will be used, and how they will be implemented.

In one embodiment, a very limited number of requirements are set to implement the method for sharing information. This method includes combining the use of a plug-in module embedded in an electronic mail client which allows use to be made of the electronic mail service as an agent for transporting the information, as well as a management application for the document for each user.

Figure 3:
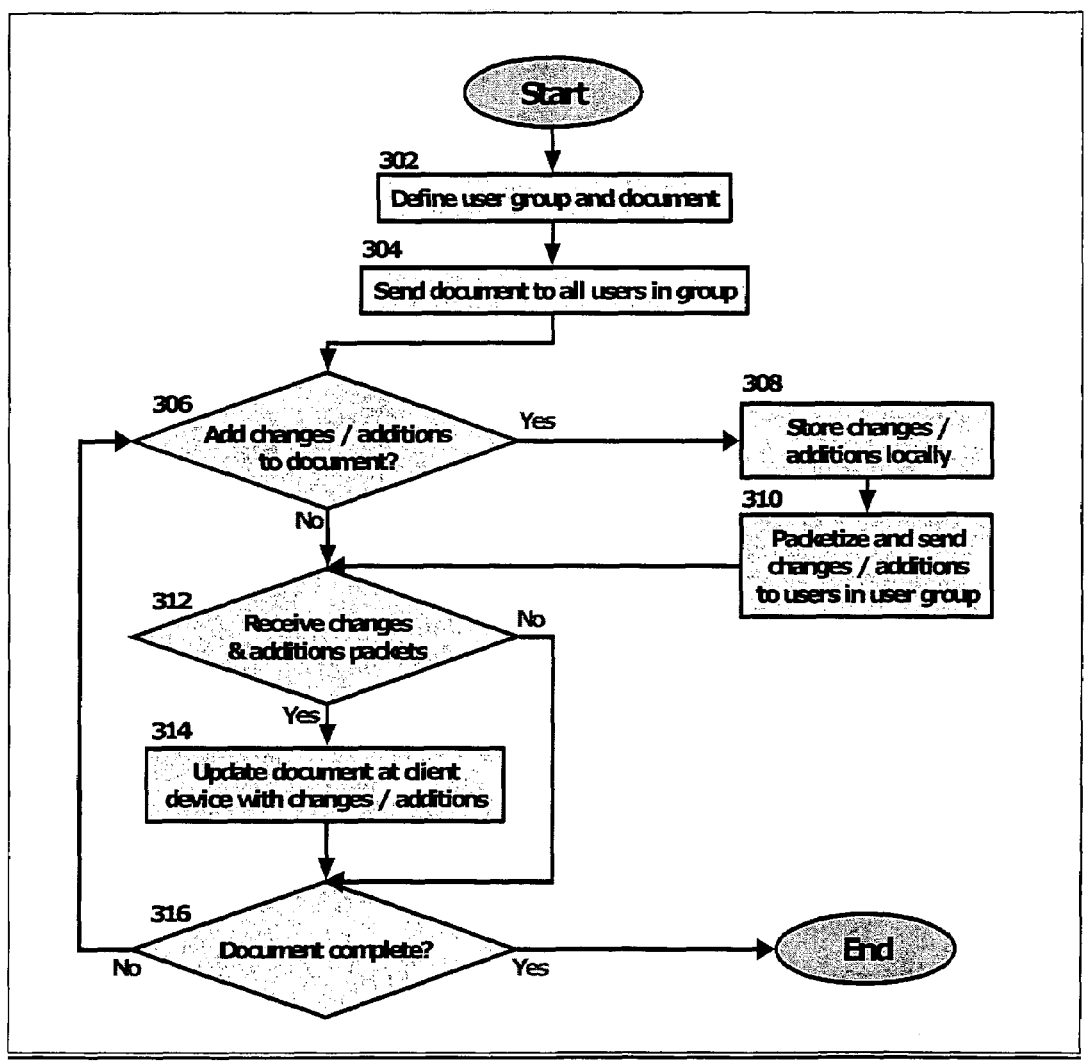
FIG. 3 depicts an exemplary flow diagram of the steps performed by a user to establish a group consistent with some embodiments of the present invention.

FIG. 3 depicts an exemplary flow diagram of the steps taken by an administrator for establishing a document and a user group consistent with principles of some embodiments of the present invention. As shown in FIG. 3, the first user or administrator defines a new electronic document (Step 302), assigning the necessary resources to it, which include the group name and its identifier, attributes, basic tools to be used (discussion areas, file repositories, images, diagrams with geometric objects, text areas, or any other, contextual comments, etc.), appearance of background, and others referring to minor aspects of appearance; and storage space.

It has been stated that each document may have its own directory with the information relating to the electronic document. It is possible to implement this solution by defining virtual spaces or directories, which are physically stored and managed on one file. It operates in the same way as discussed above and conceptually each project in particular is a document.

Once a new project has been defined with the creation of an electronic document, the context, framework or environment on which users are going to gradually include the different objects has been discussed. The new document may be sent to each of the users in the user group (Step 304) for modification. These objects will be provided by each of the users who make up the group, which is why the program allows other users to be invited to join for executing the tasks defined. The administrator carries out the job of inviting other users to join since he is the one who can grant the attributes to each of the users, thus allowing a higher or lower level of intervention and access to data.

Creation of the group takes place so that each of the users who has an electronic mail address will be incorporated into a list, which defines the group. The inclusion of each user also involves assignment of their attributes depending, for example, on their level of responsibility for the document.

The management application includes all the tools required for handling objects which can be inserted in the document, i.e., images, text, comments, links between objects, sound and, for example, files from specific external applications which they wish to incorporate as data of interest for the project. These external files are elements which are additional to the electronic document regardless of whether they are in turn opened by the specific application which created them. In this way, the electronic document belonging to this invention is a means of managing and sharing information.

When a user makes a change or addition to the document (Step 306, Yes), each of the changes and incorporations are saved on the local hard disk (Step 308) when the user requires. Each of these save options defines in turn a packet with the additional information, which are sent to the other users in the group and allows the document to be updated with the resources incorporated. This packet is not an update of the previous version of the document but it has the information on which new resources have to be incorporated or modified. This distinction is due to the fact that it is not known in advance the order in which the document is updated or which packets will intervene since each user decides alone when to synchronize his document and send his contributions to the rest of the group. A user will receive packets from others in an order, which is not pre-determined. Each of the packets should supply the resources and modifications regardless of the order of arrival.

When the document is synchronized, all the packets are taken from the spooler and are encoded and transformed into electronic mail documents by the plug-in to be sent as electronic mails (Step 310). The rest of the users will have the same plug-in in the electronic mail client so that after receiving the packets (Step 312, Yes), it identifies them by decoding them and, once the sequence of the electronic mail received is established by any suitable method, according to the sequence generated by the sender, sends them to the electronic document manager so that it can apply the modifications imposed by the packet or packets received (Step 314). This process may be repeated until a document is completed (Step 316). Although a plug-in has been used in this example, one of ordinary skill in the art may appreciate that systems and methods consistent with principles of some embodiments of the present invention may be reproduced by using a stand-alone program.

While it is true that electronic mail is a service, which makes use of a server, this cannot be considered as a medium, which defines a client-server structure in this invention. Electronic mail is merely the method of transport, which will allow a connection to be made directly between users transmitting information.

The advantage of this example of operating the invention lies in the fact that the use of electronic mail is widespread and, therefore, it is a service, which does not have to be incorporated. The possible existence of a firewall between two users does not prevent communication between them because the electronic mail service is always available and open, so it is not necessary to open new ports for a transport agent.

Each of the users may also have a graphic environment available for displaying and handling the electronic document, which is merely a tool which works on the resources it includes. The presence of information which can be displayed makes it possible for implementations from the information manager on different platforms, even in the operating system on which they are implemented, to lead to the same aspects being displayed. In other words, the visual result of the document is identical regardless of the operating system and, of course, the method of transport.

In an alternative embodiment, the stages which are the same as what has already been mentioned in the description of the invention and the embodiment discussed above will not be described. The differences involved in its implementation as a work environment integrated into the operating system will be described.

The embodiment discussed above is mainly based on the use of a group of applications at a user level. All the applications and storage resources belong to the user.

In this alternative embodiment, the method is integrated with the operating system itself since the invention is separate from the implementation mode.

When the method for sharing information is implemented integrated into the operating system, a method is obtained which is available for each user and it is a service which will be available for each application which wants to make use of it. In this case, a UNIX type, multi-user operating system is described, in which the kernel integrates the transport service. This service is a dedicated service attended by a daemon which is constantly running or listening on a port identified by its own number. This daemon may be single in the exchange of information with other machines establishing a point-to-point connection or it may be double with one responsible for sending and the other responsible for receiving.

The equivalent in electronic mail would be the SMTP service for sending and POP for receiving, where the standard ports are different.

In this case, all the computers involved in the group which shares the electronic document would have this daemon available which is capable of making the connection merely by knowing the IP number, for example. The list of users in this case will not contain the electronic mail addresses but the IP addresses of the computers in the group as well as the username for the computer in question.

The spooler for sending data is managed by the transport daemon which is why it should receive a signal from UNIX for it to wake up and establish the connections required and exchange the information with the rest of the group.

With this outline, each computer will establish a connection with each of the other computers in the group.

As this service is at kernel level, it is possible that both the spooler and the different projects may be stored in the system temporary area with access only by the daemon, or this storage may take place in the user area.

The management applications which make use of the transport daemon for synchronization would be executed at user level and would use the services provided by the operating system as another system resource.

In the case of other operating systems in which no use is made of daemons, this function would be implemented for the shell belonging to the system.

The management programs are either dedicated applications or they may be other applications. An interesting case is the graphic application desktop application. Setting up the desktop as the electronic exchange document involves sharing all the resources on a user's computer with the rest, establishing a single work space or context for all participants. In this way, not only is it possible to exchange information between users, but on the desktop itself the possibilities of handling information increase. This assertion is due to the fact that system files can be linked with comments, images or any of the operations already described. All these links and incorporations are shared with the rest of the users.

The desktop is the work environment, which each user can organize, sharing it with the rest of the users. The possibility of using the different desktops simultaneously is extended to the possibility of sharing different work environments which correspond to the different projects being developed which are supported by the exchange of information method.

In this second example, the desktop itself would become the electronic document belonging to the invention. It is possible to also consider a specific case of information management which includes unipersonal use without this meaning that it is no longer a method for exchanging information as justified below. This desktop would allow the project information to be managed and the synchronization actions would lead to a connection through an alarm daemon with the same computer for definitive incorporation of the changes applied to the electronic document thus stating, for example, the time when each of the changes was made. This type of connection with the same computer is usual in a UNIX environment, as happens with the broadest graphic environments. Unipersonal use of the application for the method belonging to this invention as specified in this example would not be limited to it, but it has been used to describe a way of carrying out such a project management strategy.

In an additional alternative embodiment, the use of stored information by making use of a mark-up language is demonstrated. The most common case of documents which use a mark-up language are web pages written in HTML. This language is not the only one, there are also docbook or latex documents among the most well-known.

A web page is a document composed of a series of objects defined using mark-up language, which is displayed using a program known as a browser. Each of the elements making up the web page have a unique identifier relating to the page or document to which they belong. In this example, the web page may be a part of the document as it is defined consistent with some embodiments of the present invention, and it is therefore a shared document, so that it is possible to incorporate additional resources or objects which will be exchanged with the group using any of the methods of transport already indicated. These additional resources will allow incorporation of a comment, for example, or a text area, a graphic element, or a voice recording.

In this case, the information to be exchanged is very little since all that is required is to transfer the address of the web page together with the identifier of the object defined through the mark-up language used by the page and, finally, the new object incorporated.

The application used as a browser may continue to be the one used for displaying the web page and the additional elements incorporated may be represented by the operating system using resources such as those described in the second example. The additional elements incorporated into the web page may have as information for establishing their definition the local coordinates or those relating to the objects on which it depends so that they may be moved or managed while maintaining the dependency established in its representation. This parent-child relationship is possible as long as the mark-up language admits identification of isolated elements.

This example clearly shows the possibility of incorporating resources which construct the document belonging to the invention in a unique context as the environment for collaboration on an interface which initially lacked this capacity.

Principles consistent with some embodiments of the present invention are not altered by variations in materials, form, size and layout of the elements making it up, described in a manner which does not limit them, with this being enough for it to be reproduced by an expert.

What is claimed is:

1. A method for sharing information between a group of users, wherein decentralized storage of a shared electronic document is provided where each user has a copy of the document, in which each of the users may make changes by incorporating or modifying information, where the exchange of data for synchronizing the document belonging to a given user with the rest by making them co-sharers of such changes comprises the following stages:

an operation for saving the information in the local storage unit where only the new resources which are incorporated into the document, or those modified, are also stored in an information packet which is available in a spooler or waiting area for data to sent a synchronization order is issued which consists of encoding, packaging and sequencing of the data to adapt it to the transport manager sending to the rest of the users included in the list of users of all packets from the spooler encoded, with the dispatch being made from the computer which issues the synchronization order to each of the remaining computers receipt of the packets by the rest of the computers with decoding of them taking place to transform them into packets of resources to be incorporated, according to the sending sequence, into the copies of the document of the users receiving them generation of the resources which allow the document to be updated from the decoded packet transfer of the new document to the information manager for processing where all users have an exact copy of the updated document when all users carry out the synchronization order.

2. The method for sharing information between a user group according to claim 1, wherein the user group which shares an electronic document is created by a first user or administrator.

3. The method for sharing information between a user group according to claim 2, wherein the administrator is the one who grants the various access privileges to new users.

4. The method for sharing information between a user group according to claim 1, wherein the agent transporting the encoded packets is the electronic mail client.

5. The method for sharing information between a user group according to claim 1, wherein the agent transporting the encoded packets is a service from the operating system with the ability to establish a connection and point-to-point transmission with each of the computers in the group.

6. The method for sharing information between a user group according to claim 5, wherein the service for connection and transmission of the packets is implemented as a daemon function for UNIX type systems, or developed for the shell of any other operating system.

7. The method for sharing information between a user group according to claim 1, wherein the packaging, encoding, sequencing, transmission and decoding and sequence verification stages are carried out by the kernel of the operating system and offered as a system resource to the rest of the applications.

8. The method for sharing information between a user group according to claim 7, wherein the electronic document comprises the desktop of the graphic environment.

9. The method for sharing information between a user group according to claim 1, wherein the base document makes use of a mark-up language.

10. The method for sharing information between a user group according to claim 9, wherein the mark-up language used is HTML on a web page.

11. The method for sharing information between a user group according to claim 1, wherein the development of the project is established in a single computer with unipersonal use.

12. The electronic document to be shared according to the method in any one of the above claims wherein the electronic document includes at least one of the following elements:
 a group identifier;
 a list of users making up the group;
 a viewing structure to allow exact reproduction of the document for all users;
 the group of objects contained in the document; and
 storage space.

13. The electronic document according to claim 12, wherein the objects included in the document may maintain a parent-child relationship.

14. The electronic document according to claim 12, wherein the objects include information on each of the changes with information on the author of the change as well as the time when the change was made.

15. The electronic document according to claim 12, wherein the objects may be container object which in turn contain other objects.

16. The electronic document according to claim 12, wherein it is stored in its own space, separate from other shared electronic documents.

17. The electronic document according to claim 12, wherein it is stored in a common space with other shared electronic documents, with the information manager being responsible for establishing the difference.

18. The electronic document according to claim 12, wherein the electronic document comprises the desktop.

19. The electronic document according to claim 12, wherein the electronic document is based on mark-up language.

20. The electronic document according to claim 19, wherein the electronic document uses a web page in HTML.

* * * * *